United States Patent
Cao et al.

(10) Patent No.: US 12,414,158 B2
(45) Date of Patent: Sep. 9, 2025

(54) TECHNIQUES FOR IMPROVING EFFICIENCY IN SIDELINK WIRELESS COMMUNICATIONS

(71) Applicant: QUALCOMM Incorporated, San Diego, CA (US)

(72) Inventors: Yiqing Cao, Beijing (CN); Jing Lei, San Diego, CA (US); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/632,466

(22) PCT Filed: Sep. 10, 2020

(86) PCT No.: PCT/CN2020/114496
§ 371 (c)(1),
(2) Date: Feb. 2, 2022

(87) PCT Pub. No.: WO2021/047586
PCT Pub. Date: Mar. 18, 2021

(65) Prior Publication Data
US 2022/0295564 A1 Sep. 15, 2022

(30) Foreign Application Priority Data
Sep. 12, 2019 (WO) ................ PCT/CN2019/105535

(51) Int. Cl.
*H04W 74/08* (2024.01)
*H04W 74/0833* (2024.01)
*H04W 92/18* (2009.01)

(52) U.S. Cl.
CPC ........ *H04W 74/0833* (2013.01); *H04W 92/18* (2013.01)

(58) Field of Classification Search
CPC ..... H04W 74/08; H04W 74/00; H04W 72/02; H04W 72/04; H04W 72/12; H04W 72/20;
(Continued)

(56) References Cited

U.S. PATENT DOCUMENTS 9,210,536 B2 * 12/2015 Salkintzis ........... H04L 65/1069
9,313,607 B2 * 4/2016 Dimou .................... H04W 4/70
(Continued)

FOREIGN PATENT DOCUMENTS

CN 104105103 A 10/2014
CN 105379405 A 3/2016
(Continued)

OTHER PUBLICATIONS

Intel Corporation: "Summary 3 on SCell BFR and L1-SINR", 3GPP Draft, 3GPP TSG RAN WG1 Meeting #96b, R1-1905844, Summary on SCell BFR and L1-SINR_V7, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019 Apr. 15, 2019 (Apr. 15, 2019), XP051707890, pp. 1-23.
(Continued)

*Primary Examiner* — Man U Phan
(74) *Attorney, Agent, or Firm* — ArentFox Schiff LLP

(57) ABSTRACT

Some aspects described herein relate to receiving, from a base station, a configuration to transmit uplink signaling to the base station, determining, based on the configuration, to setup a group for sidelink communication with one or more other user equipments (UEs), transmitting, based on determining to setup the group, a first uplink message based on the configuration from the base station, and receiving, from the one or more other UEs, a second uplink message based on the configuration to indicate setup of the group. Some
(Continued)

aspects described herein also relate to conflict avoidance between sidelink and uplink/downlink communications.

36 Claims, 10 Drawing Sheets

(58) Field of Classification Search
CPC ..... H04W 72/23; H04W 72/51; H04W 76/14; H04W 76/27; H04W 76/30; H04W 92/18; H04W 4/08; H04W 8/00; H04W 24/10; H04W 36/34; H04W 28/20; H04W 40/24; H04L 5/00; H04L 5/14; H04L 27/26
USPC .......................................................... 370/329
See application file for complete search history.

(56) References Cited

U.S. PATENT DOCUMENTS

| | | | | |
|---|---|---|---|---|
| 10,411,789 | B2* | 9/2019 | Loehr | H04B 7/15542 |
| 10,798,723 | B2* | 10/2020 | Hong | H04W 72/21 |
| 10,834,747 | B2* | 11/2020 | Lu | H04W 72/21 |
| 10,897,706 | B2* | 1/2021 | Gopalan | H04W 12/0431 |
| 11,265,858 | B2* | 3/2022 | Byun | H04W 72/23 |
| 11,330,401 | B2* | 5/2022 | Novlan | H04W 4/06 |
| 11,438,736 | B2* | 9/2022 | Fehrenbach | H04W 4/08 |
| 11,457,430 | B2* | 9/2022 | Hwang | H04L 5/00 |
| 11,825,448 | B2* | 11/2023 | Zhang | H04W 72/56 |
| 11,855,762 | B2* | 12/2023 | Kwak | H04B 17/318 |
| 11,856,600 | B2* | 12/2023 | Lee | H04W 92/18 |
| 11,864,163 | B2* | 1/2024 | Selvanesan | H04W 4/40 |
| 11,882,555 | B2* | 1/2024 | Roth-Mandutz | H04W 76/11 |
| 11,889,406 | B2* | 1/2024 | Rao | H04W 8/24 |
| 2016/0278053 | A1 | 9/2016 | Lee et al. | |
| 2017/0257898 | A1* | 9/2017 | Maaref | H04W 8/186 |
| 2019/0215759 | A1 | 7/2019 | Wei et al. | |
| 2020/0163005 | A1* | 5/2020 | Rao | H04W 4/44 |
| 2022/0408226 | A1* | 12/2022 | Fehrenbach | H04W 84/005 |
| 2024/0098705 | A1* | 3/2024 | Selvanesan | H04W 4/08 |

FOREIGN PATENT DOCUMENTS

| | | |
|---|---|---|
| CN | 108702751 A | 10/2018 |
| CN | 109891987 A | 6/2019 |
| JP | 2018191130 A | 11/2018 |
| WO | 2016021703 A1 | 2/2016 |
| WO | 2018062648 A1 | 4/2018 |
| WO | 2018082571 A1 | 5/2018 |
| WO | 2018202797 A1 | 11/2018 |
| WO | 2018202798 A1 | 11/2018 |
| WO | 2019009454 A1 | 1/2019 |
| WO | 2019160788 A1 | 8/2019 |

OTHER PUBLICATIONS

International Search Report and Written Opinion—PCT/CN2019/105535—ISA/EPO—Jun. 11, 2020.
International Search Report and Written Opinion—PCT/CN2020/114496—ISA/EPO—Dec. 9, 2020.
Vivo: "Sidelink Groupcast and Broadcast in NR", 3GPP TSG-RAN WG2 Meeting #106, R2-1905844; May 17, 2019 (May 17, 2019), Reno, USA, May 13-17, 2019, 3 Pages.
Supplementary European Search Report—EP20863130—Search Authority—The Hague—Jul. 11, 2023.
Fujitsu: "Resource Allocation for NR V2X Sidelink Communication", 3GPP TSG RAN WG1 Meeting #95bis, 3GPP Draft, R1-1812410, Resource Allocation for NR V2X Sidelink Communication Final, 3rd Generation Partnership Project (3GPP), Mobile Competence Centre, 650, Route Des Lucioles, F-06921 Sophia-Antipolis, vol. RAN WG2, No. Spokane, United States, Nov. 12, 2018-Nov. 16, 2018, Nov. 2, 2018 (Nov. 2, 2018), XP051478610, 9 Pages, Proposal 7.
Taiwan Search Report—TW109131280—TIPO—Apr. 3, 2024.
LG Electronics Inc: "Basic Scenarios and Overall Steps for NR Sidelink Design", 3GPP TSG-RAN WG2 #103bis, R2-1815440, Chengdu, China, Oct. 8, 2018-Oct. 12, 2018, Sep. 28, 2018, pp. 1-9.
Samsung: "On Resource Allocation for NR V2X Mode 1", 3GPP TSG RAN WG1 #97, R1-1906935, Reno, USA, May 13, 2019-May 17, 2019, May 4, 2019, pp. 1-10.
Taiwan Search Report—TW109131280—TIPO—Jul. 4, 2025.

* cited by examiner

TECHNIQUES FOR IMPROVING EFFICIENCY IN SIDELINK WIRELESS COMMUNICATIONS

CROSS-REFERENCE TO RELATED APPLICATION

This application is a 35 U.S.C. § 371 National Phase Application of PCT Application No. PCT/CN2020/114496 filed Sep. 10, 2020, entitled "TECHNIQUES FOR IMPROVING EFFICIENCY IN SIDELINK WIRELESS COMMUNICATIONS", which claims priority to International Patent Application No. PCT/CN2019/105535 filed Sep. 12, 2019, entitled "TECHNIQUES FOR IMPROVING EFFICIENCY IN SIDELINK WIRELESS COMMUNICATIONS." The disclosures of these prior applications are hereby incorporated by reference herein in their entirety.

BACKGROUND

Aspects of the present disclosure relate generally to wireless communication systems, and more particularly, to performing sidelink communications among devices.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate with a base station to receive access to a wireless network and communicate with other UEs. In some scenarios where nearby UEs are communicating with one another, such as interactive gaming, traversing the base station and other network components for direct communications with a nearby UE may use a large amount of network resources and may be subject to undesirable delay in communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, from a base station, a configuration to transmit uplink signaling to the base station, determining, based on the configuration, to setup a group for sidelink communication with one or more other user equipments (UEs), transmitting, based on determining to setup the group, a first uplink message based on the configuration from the base station, and receiving, from the one or more other UEs, a second uplink message based on the configuration to indicate setup of the group.

In another example, a method of wireless communication is provided that includes receiving, from a base station, a configuration to transmit uplink signaling to the base station, receiving, from a UE, a first uplink message based on the configuration from the base station, determining, based on the first uplink message received from the UE, to setup a group for sidelink communication with the UE, and transmitting, based on determining to setup the group, a second uplink message over uplink resources determined based on the configuration to indicate setup of the group.

In another example, a method of wireless communication is provided that includes receiving, from multiple UEs, one or more signals, determining, based on one or more parameters associated with the one or more signals, a possible grouping of a subset of the multiple UEs, and transmitting, to the subset of the multiple UEs and based on determining the possible grouping, configurations to transmit uplink signaling over uplink resources to setup the possible grouping between the subset of the multiple UEs for sidelink communications.

In another example, a method of wireless communication is provided that includes determining to transmit sidelink communications to one or more UEs in a first time period, transmitting, in a second time period preceding the first time period and based on determining to transmit the sidelink communications, a notification signal to indicate transmission of the sidelink communications in the first time period, and receiving, from the one or more UEs or a base station, feedback indicating whether communications are scheduled in the first time period.

In another example, a method of wireless communication is provided that includes receiving, from a UE and in a first time period preceding a second time period, a notification signal to indicate transmission of sidelink communications in the second time period, determining whether resources are scheduled for communications in the second time period, and transmitting, to the UE and in the first time period, feedback indicating whether communications are scheduled in the second time period.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
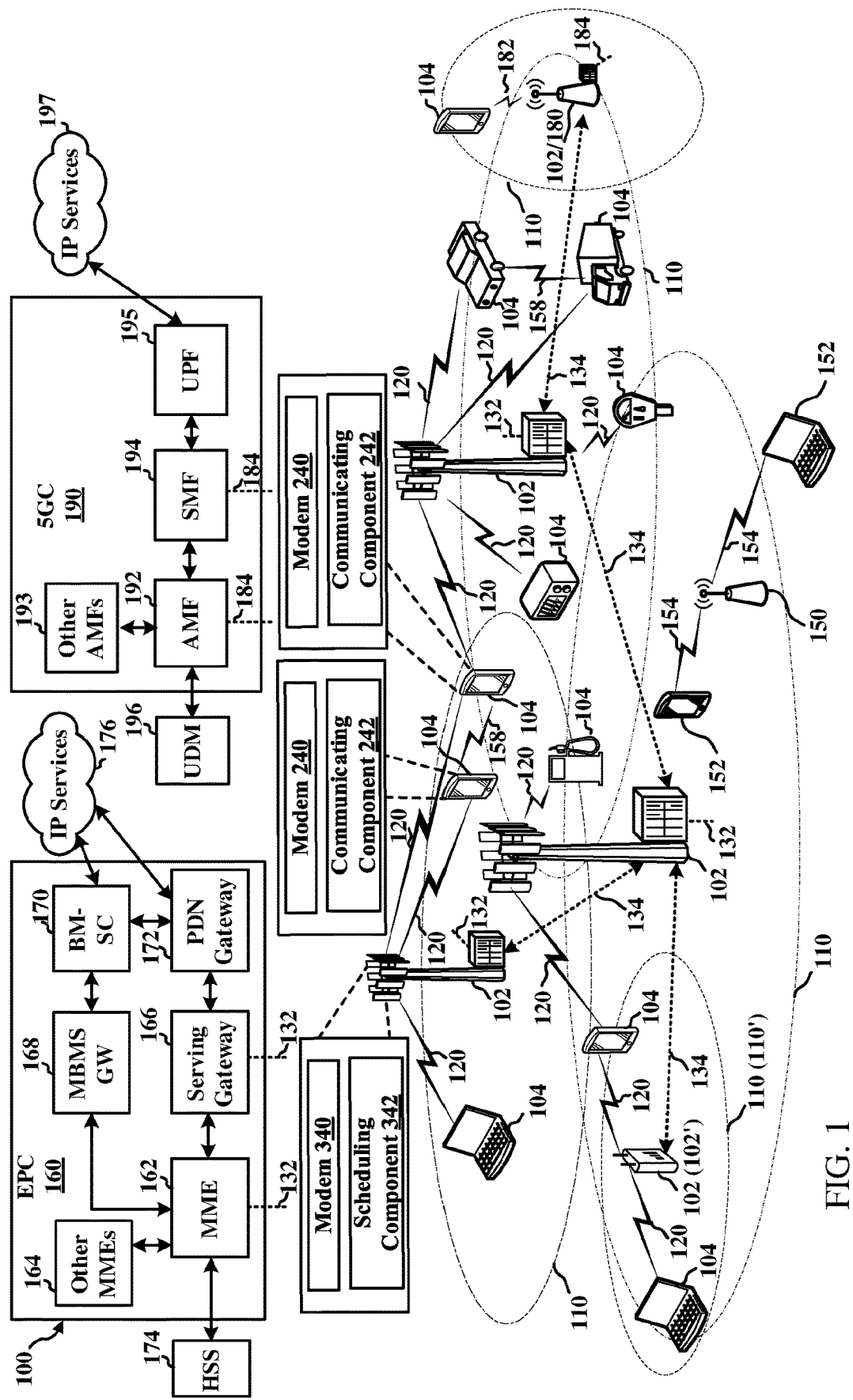
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using sidelink resources for offloading or otherwise performing communications among nearby user equipment (UEs). For example, a UE configured for communicating with a base station in a wireless network can offload communications related to a nearby UE using sidelink communications, which may improve experience and network efficiency in certain scenarios, such as interactive gaming. To facilitate the sidelink communications, in one example, nearby UEs can formulate, or otherwise be associated in, a group of UEs for the sidelink communications. For example, the base station can assist in establishing the group of UEs by triggering the UEs to transmit an uplink communication (e.g., random access channel (RACH) communication, such as a RACH preamble), and may configure nearby UEs to transmit similar uplink communications (e.g., RACH communications using the same specific RACH preamble). The UEs can monitor for uplink communications from other UEs and can pair or group with UEs within a certain distance (e.g., within a certain receive timing) for sidelink communications. In an example, the UEs detecting the uplink communications can transmit a feedback communication (e.g., RACH response) over the uplink channel to indicate group setup to the UE from which the uplink communications are detected.

In addition, when the UEs are concurrently configured for sidelink communications and communications with the base station, the UEs may experience conflict of using sidelink resources with other UEs and uplink/downlink resources with the base station. In one example, to avoid conflict between transmitting sidelink communications and receiving downlink communications, a transmitting UE can transmit a conflict avoidance signal to notify a receiving UE about an upcoming sidelink transmission, and the receiving UE can transmit feedback to the transmitting UE indicating whether the receiving UE can receive the sidelink communications (e.g., based on whether the receiving UE is scheduled to receive communications from the base station). Similarly, for example, the transmitting UE can transmit a conflict avoidance signal to the base station to notify the base station about an upcoming sidelink transmission, and the base station can avoid scheduling the UE in associated resources and/or can transmit feedback to the UE indicating whether the UE can transmit the sidelink transmission over the resources. In another example, the UE can determine whether to prioritize sidelink transmissions to one or more UEs over uplink transmissions to the base station based on one or more priority rules configured in the UE. In one example, the transmitting UE may transmit the conflict avoidance signal as, or with, the uplink signaling described above for establishing the group of UEs and/or the receiving UE or base station can transmit the feedback as, or with, the feedback signaling described above.

Grouping UEs for sidelink communications in this regard can allow for more efficient spectrum usage and/or improved performance by using the sidelink without having to traverse the base station or the rest of the network. In addition, the conflict avoidance strategies can allow for desirable use of the sidelink resources while mitigating interference that may be caused by communications between the UEs and base station.

The described features will be presented in more detail below with reference to FIGS. 1-10.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for establishing sidelink communication groups and/or avoiding conflict in transmitting sidelink communications and communications transmitted/received with a base station 102. In addition, some nodes may have a modem 340 and scheduling component 342 for configuring UEs to form sidelink communication groups and/or avoiding conflict in transmitting/receiving communications with UEs 104 and sidelink communications therebetween, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UEs 104 can establish sidelink communication groups based on communicating components 242 transmitting uplink communications, which can be received by other UEs 104 having communicating components 242 to determine whether to setup a group for sidelink communications. In one example, scheduling component 342 can configure the UEs 104 to transmit uplink communications, such as random access channel (RACH) communications, and can configure UEs 104 determined to possibly be located near one another to transmit similar uplink communications (e.g., the same RACH preamble or to select a RACH preamble from the same group of preambles). In this regard, the communicating components 242 of the UEs 104 can detect similar uplink communications and can determine to form a group with one another for sidelink communications. In addition, communicating component 242 can avoid conflict in transmitting sidelink communications by transmitting a conflict avoidance signal, which can be received by a receiving UE 104 or base station 102. The communicating component 242 of a receiving UE 104 or scheduling component 342 of a receiving base station 102 can transmit feedback for the conflict avoidance signal indicating whether sidelink communications can be transmitted over indicated resources.

Turning now to FIGS. 2-10, aspects are depicted with reference to one or more components and one or more methods that may perform the actions or operations described herein, where aspects in dashed line may be optional. Although the operations described below in FIGS. 4-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
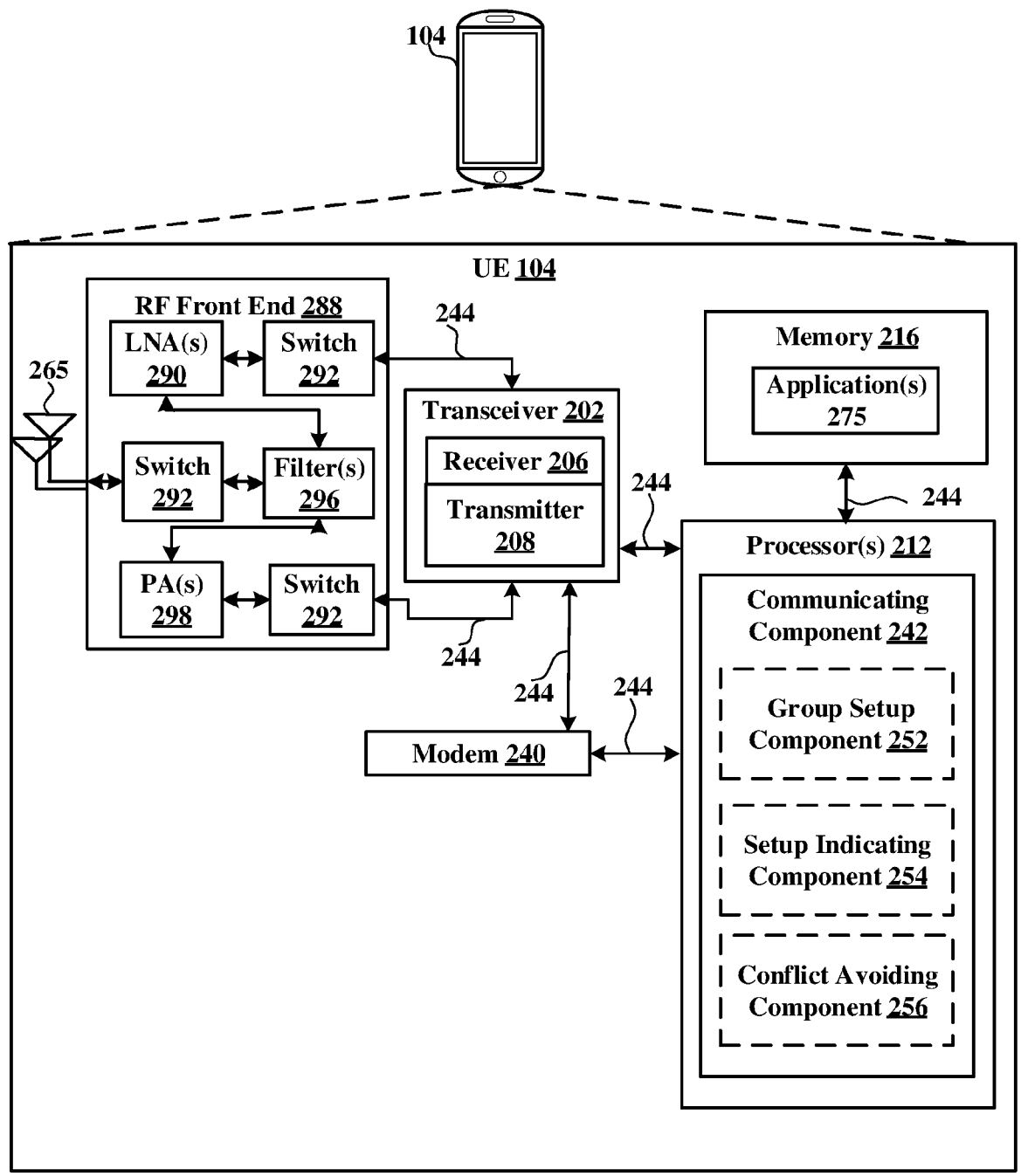
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for establishing a group for sidelink communications and/or communicating conflict avoidance signaling for sidelink communications, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a group setup component 252 for attempting to setup a group of UEs for sidelink communications, a setup indicating component 254 for indicating setup of a group of UEs based on received signaling from one or more UEs, and/or a conflict avoiding component 256 for communicating conflict avoidance signaling to mitigate conflict between sidelink communications and communications between UEs and a base station, as described herein.

In an aspect, the processor(s) 212 may correspond to one or more of the processors described in connection with the UE in FIG. 10. Similarly, the memory 216 may correspond to the memory described in connection with the UE in FIG. 10.

Figure 3:
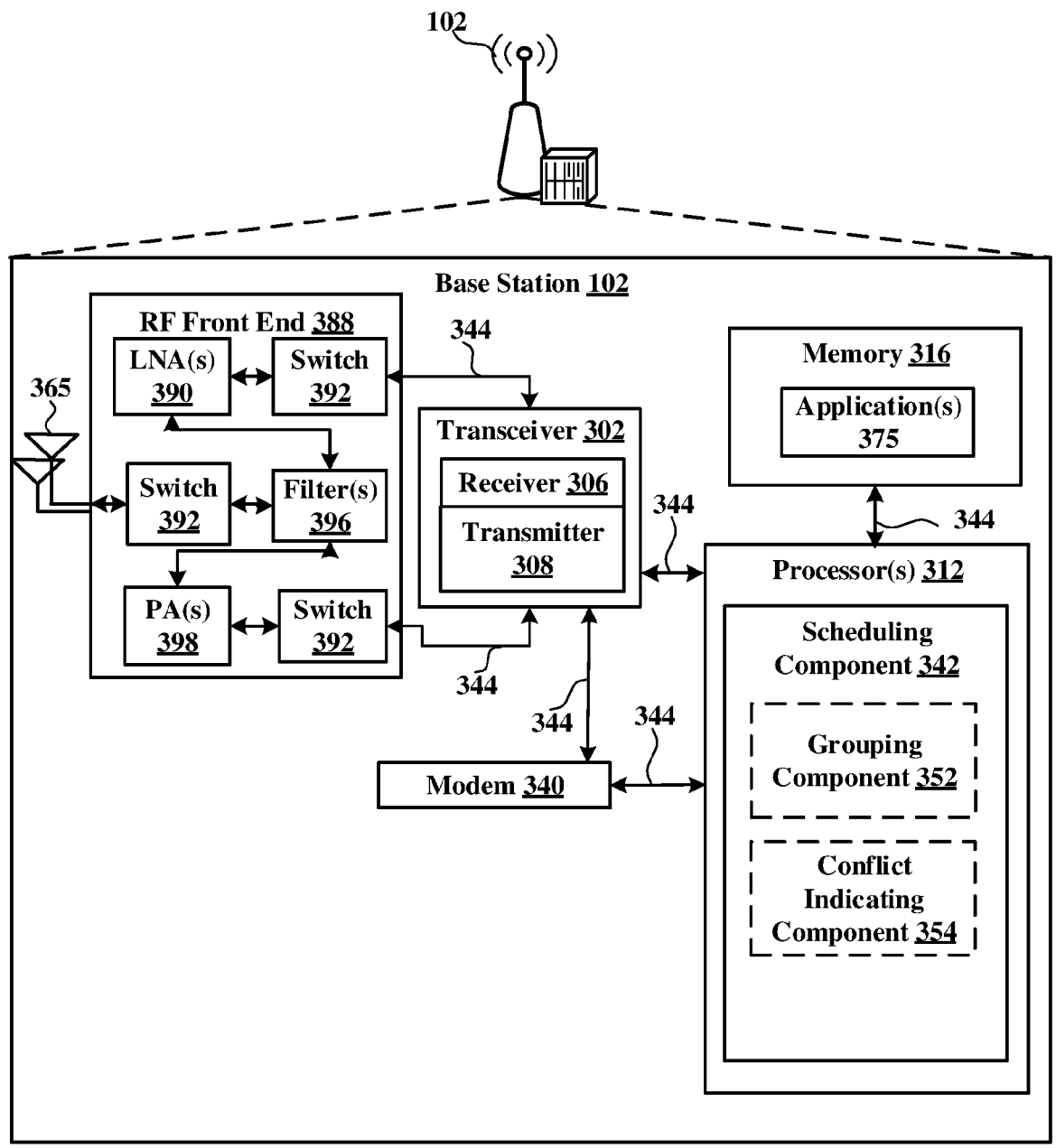
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling uplink communications to establish a group of UEs for sidelink communications and/or communicating conflict avoidance signaling for sidelink communications, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a grouping component 352 for configuring one or more UEs to transmit signaling to establish a group for sidelink communications, and/or a conflict indicating component 354 for indicating whether sidelink communication resources conflict with resources for transmitting downlink communications to, or transmitting uplink communications from, one or more corresponding UEs.

In an aspect, the processor(s) 312 may correspond to one or more of the processors described in connection with the base station in FIG. 10. Similarly, the memory 316 may correspond to the memory described in connection with the base station in FIG. 10.

Figure 4:
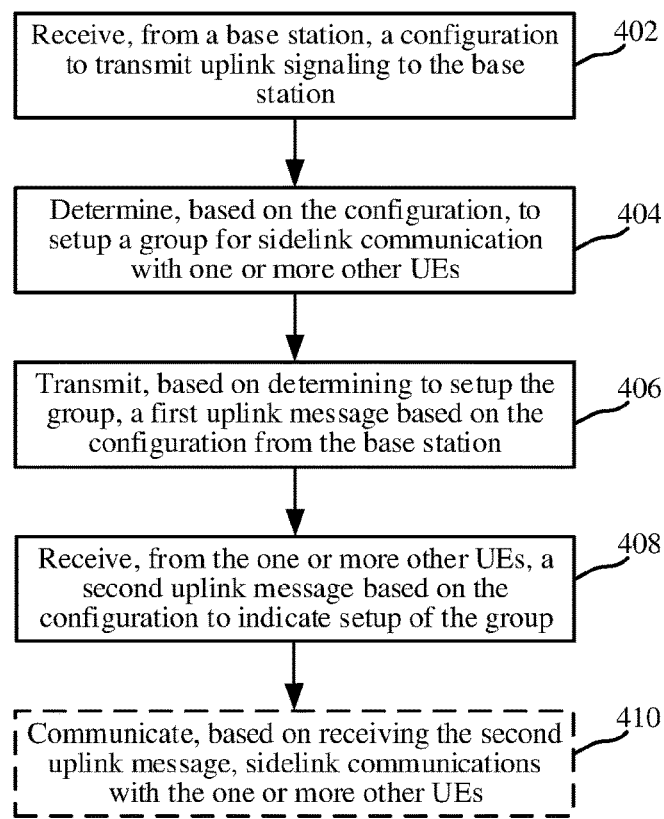
FIG. 4 is a flow chart illustrating an example of a method for setting up a group of user equipment (UEs) for sidelink communications, in accordance with various aspects of the present disclosure.
Figure 5:
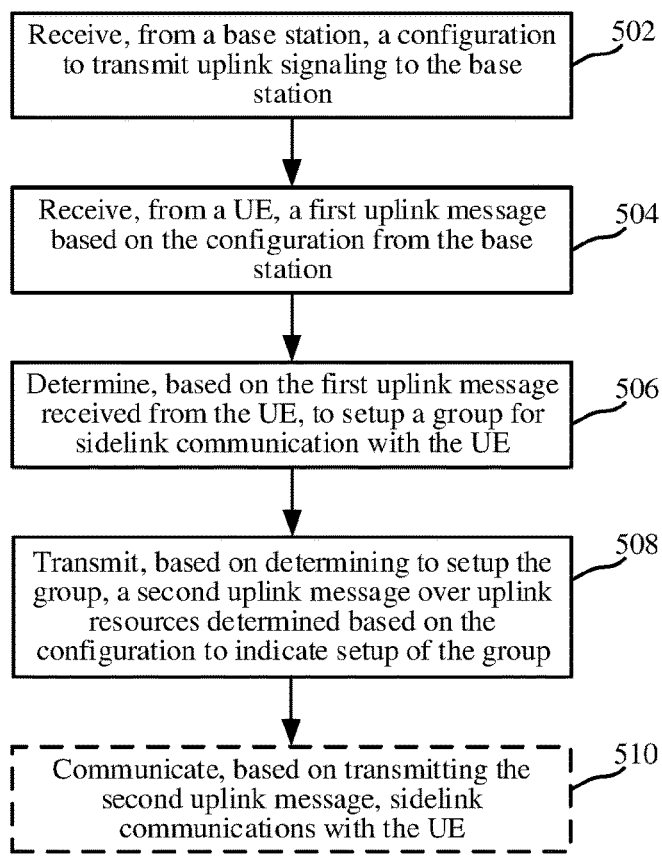
FIG. 5 is a flow chart illustrating an example of a method for indicating setup of a group of UEs for sidelink communications, in accordance with various aspects of the present disclosure.

FIG. 4 illustrates a flow chart of an example of a method 400 for attempting to setup a group of UEs for sidelink communications. FIG. 5 illustrates a flow chart of an example of a method 500 for indicating setup of a group of UEs for sidelink communications. Methods 400 and 500 are described in conjunction with one another for ease of explanation, though the methods 400 and 500 are not required to be performed in conjunction. In an example, a UE 104 can perform the functions described in method 400 using one or more of the components described in FIGS. 1 and 2 and/or another UE 104 can perform the functions described in method 500 using one or more of the components described in FIGS. 1 and 2 (and in one example, a given UE 104 can be configured to perform both methods 400 and 500).

In method 400, at Block 402, a configuration can be received, from a base station, to transmit uplink signaling to the base station. In an aspect, group setup component 252, e.g., in conjunction with processor(s) 212, memory 216, transceiver 202, communicating component 242, etc., can receive, from the base station, the configuration to transmit uplink signaling to the base station. As described above and further herein, a base station 102 can configure multiple UEs to transmit uplink signaling in an attempt to associate the UEs in a group of UEs for sidelink communications. The received configuration can indicate similar uplink signaling to transmit for UEs that are determined to be near one another. For example, the uplink signaling can correspond to RACH signaling, and the similarity for the UEs can include indication of a similar RACH preamble for nearby UEs to transmit, or a similar group of RACH preambles from which the nearby UEs can select for transmitting to the base station 102. In an example, group setup component 252 can receive the configuration in radio resource control (RRC) signaling, downlink control information (DCI) signaling (e.g., over physical downlink control channel (PDCCH)), etc. from the base station 102.

In method 400, at Block 404, it can be determined, based on the configuration, to setup a group for sidelink communication with one or more other UEs. In an aspect, group setup component 252, e.g., in conjunction with processor(s) 212, memory 216, transceiver 202, communicating component 242, etc., can determine, based on the configuration to setup the group for sidelink communication with one or more other UEs. For example, receiving the configuration can be a trigger to attempt to setup the group for sidelink communication by transmitting the corresponding uplink signaling based on the configuration. In one example, the configuration may include an indicator that it relates to group setup for sidelink communications, which can be an explicit indicator in the configuration, an implicit indicator based on one or more parameters in the configuration, etc.

In method 400, at Block 406, a first uplink message based on the configuration from the base station can be transmitted based on determining to setup the group. In an aspect, group setup component 252, e.g., in conjunction with processor(s) 212, memory 216, transceiver 202, communicating component 242, etc., can transmit, based on determining to setup the group, the first uplink message based on the configuration from the base station. For example, group setup component 252 can transmit the first uplink message based on one or more parameters specified in the configuration. As described, in an example, the configuration can indicate to transmit a RACH preamble (e.g., for a connected-mode UE), which may be the same as nearby UEs to enable the UEs to detect and receive RACH preambles from one another. In another example, the configuration can indicate to select a RACH preamble from a group of preambles (e.g., for an idle-mode UE), where the group of preambles may be similar to that configured for nearby UEs to enable the UEs to detect and receive RACH preambles from the group of preambles. In another example, the configuration may indicate a RACH occasion for transmitting the RACH preamble, and the group setup component 252 can accordingly transmit the RACH preamble in the configured RACH occasion. Where the first uplink message is RACH, for example, group setup component 252 can transmit the RACH preamble as MSG-A physical uplink shared channel (PUSCH) in a two-step RACH procedure or MSG1 preamble in a four-step RACH procedure.

In an example, group setup component 252 can transmit additional information in the uplink signaling, where the additional information can include parameters for establishing sidelink communications. For example, the additional information can include a timing adjustment/advance used by the transmitting UE 104 for transmitting uplink and/or sidelink communications, transmitting (Tx) and/or receiving (Rx) resource pool from which to select resources for sidelink communications, a sidelink radio network temporary identifier (SL-RNTI) for identifying sidelink communications, information for transmission over sidelink resources, such as transmit power, modulation and coding scheme (MCS), etc., and/or the like.

As described, method 400 can be performed by a first UE and method 500 can be performed by a second UE, where the first UE and second UE may establish a group for sidelink communications. In method 500, at Block 502, a configuration can be received, from a base station, to transmit uplink signaling to the base station. In an aspect, group setup component 252, e.g., in conjunction with processor(s) 212, memory 216, transceiver 202, communicating component 242, etc., can receive, from the base station, the configuration to transmit uplink signaling to the base station. This can be similar to the configuration received by the other UE in Block 402 of method 400, described above, and thus may be based on the UEs that are performing methods 400 and 500 being near one another.

In method 500, at Block 504, a first uplink message can be received, from a UE, based on the configuration from the base station. In an aspect, group setup component 252, e.g., in conjunction with processor(s) 212, memory 216, transceiver 202, communicating component 242, etc., can receive, from the UE, the first uplink message based on the configuration from the base station. As described, the first uplink message may be intended for the base station 102, but may also be received by nearby UEs. For example, the first uplink message can be transmitted based on the configuration (e.g., RACH configuration) received from the base station by another UE. In an example, as described, the first uplink message may include a RACH message with a RACH preamble selected or determined based on the configuration for establishing a group for sidelink communications.

In method 500, at Block 506, it can be determined, based on the first uplink message received from the UE, to setup a group for sidelink communication with the UE. In an aspect, setup indicating component 254, e.g., in conjunction with processor(s) 212, memory 216, transceiver 202, communicating component 242, etc., can determine, based on the first uplink message received from the UE, to setup a group for sidelink communication with the UE. For example, setup indicating component 254 (e.g., of one UE) can receive the first uplink message, as transmitted from the UE (e.g., from another UE) to the base station. Based on receiving the first uplink message and/or one or more parameters thereof, setup indicating component 254 can determine to setup the group with the UE. For example, setup indicating component 254 can determine to setup the group based on a received signal strength/quality of the first uplink signal, based on a contents of the signal (e.g., a RACH preamble of the signal), based on a receive timing or occasion (e.g., RACH occasion) of the signal (e.g., which may indicate a distance to the UE), based on a beam used to transmit the signal (e.g., which may indicate proximity where both UEs use the same or similar beams for communicating with the base station 102), etc. In one example, setup indicating component 254 can compare the receive timing or occasion to a known or determined transmission timing (which may be indicated in the first uplink signal or otherwise known), which may imply a distance between the UEs, to determine whether to setup the group. In another example, setup indicating component 254 can determine to setup the group based on information indicated in the first uplink signal (e.g., RACH preamble of the signal, timing adjustment/advance, Tx/Rx resource pool for sidelink, transmit power, MCS, etc. indicated in the signal, and/or the like).

In method 500, at Block 508, a second uplink message can be transmitted, based on determining to setup the group, over uplink resources determined based on the configuration to indicate setup of the group. In an aspect, setup indicating component 254, e.g., in conjunction with processor(s) 212, memory 216, transceiver 202, communicating component 242, etc., can transmit, based on determining to setup the group, the second uplink message over uplink resources determined based on the configuration to indicate setup of the group. For example, setup indicating component 254 can transmit the second uplink message as a RACH response with a modified random access-RNTI (RA-RNTI), which may include the preamble and a RACH resource, to formulate the group. In an example, second uplink message (and/or the first uplink message) can be transmitted with a demodulation reference signal (DM-RS) or other reference signal to facilitate detection and demodulation of the uplink message.

Moreover, in an example, the second uplink message may additionally or alternatively include the additional information related to sidelink communications, such as timing adjustment/advance, Tx/Rx resource pool for sidelink communications, SL-RNTI, transmit power, MCS, etc. In any case, setup indicating component 254 can indicate setup of the group by transmitting the second uplink message to the UE that transmitted the first uplink message as a response to the first uplink message. In addition, for example, setup indicating component 254 can transmit the RACH response (e.g., MSG-B in two-step RACH or MSG-2 in four-step RACH) over RACH resources configured by the base station 102 (e.g., in the configuration received at Block 502).

In method 400, at Block 408, a second uplink message based on the configuration can be received from the one or more other UEs to indicate setup of the group. In an aspect, group setup component 252, e.g., in conjunction with processor(s) 212, memory 216, transceiver 202, communicating component 242, etc., can receive, from the one or more other UEs, the second uplink message based on the configuration to indicate setup of the group. For example, as described, group setup component 252 can receive the second uplink message as a RACH response from the one or more UEs to the first uplink message transmitted by the group setup component 252 (e.g., at Block 406). The second uplink message can indicate setup of the group and/or can include other parameters for sidelink communication among the group (e.g., along with or alternatively to information that may be specified in the first uplink message, as described above). In one example, group setup component 252 can confirm the group setup message (e.g., confirm receipt of the RACH response indicating group setup) or can directly transmit data with the configured resource.

In method 400, optionally at Block 410, sidelink communications can be communicated, based on receiving the second uplink message, with the one or more other UEs. In an aspect, communicating component 242, e.g., in conjunction with processor(s) 212, memory 216, transceiver 202, etc., can communicate, based on receiving the second uplink message, sidelink communications with the one or more other UEs. For example, communicating component 242 can communicate the sidelink communications by transmitting to, or receiving from, the one or more other UEs over one or more sidelink channels (e.g., PSCCH, PSSCH, etc.), which can be based on establishing the group with the one or more other UEs. In addition, for example, the sidelink communications can be based on parameters transmitted in the first uplink message or received in the second uplink message (e.g., using an indicated timing adjustment/advance, over resources indicated in the Tx/Rx resource pool for sidelink communications, using a SL-RNTI, transmit power, MCS, etc., and/or the like). As described, the sidelink communications can be used to offload communications via the network or otherwise improve performance when communicating with nearby UEs (e.g., for interactive gaming or other data-rich scenarios).

Similarly, in method 500, optionally at Block 510, sidelink communications can be communicated, based on receiving the second uplink message, with the UE. In an aspect, communicating component 242, e.g., in conjunction with processor(s) 212, memory 216, transceiver 202, etc., can communicate, based on receiving the second uplink message, sidelink communications with the UE. For example, communicating component 242 can communicate the sidelink communications by transmitting to, or receiving from, the UE over one or more sidelink channels (e.g., PSCCH, PSSCH, etc.), which can be based on establishing the group with the UE. In addition, for example, the sidelink communications can be based on parameters received in the first uplink message or transmitted in the second uplink message (e.g., using an indicated timing adjustment/advance, over resources indicated in the Tx/Rx resource pool for sidelink communications, using a SL-RNTI, transmit power, MCS, etc., and/or the like). As described, the sidelink communications can be used to offload communications via the network or otherwise improve performance when communicating with nearby UEs (e.g., for interactive gaming or other data-rich scenarios).

Figure 6:
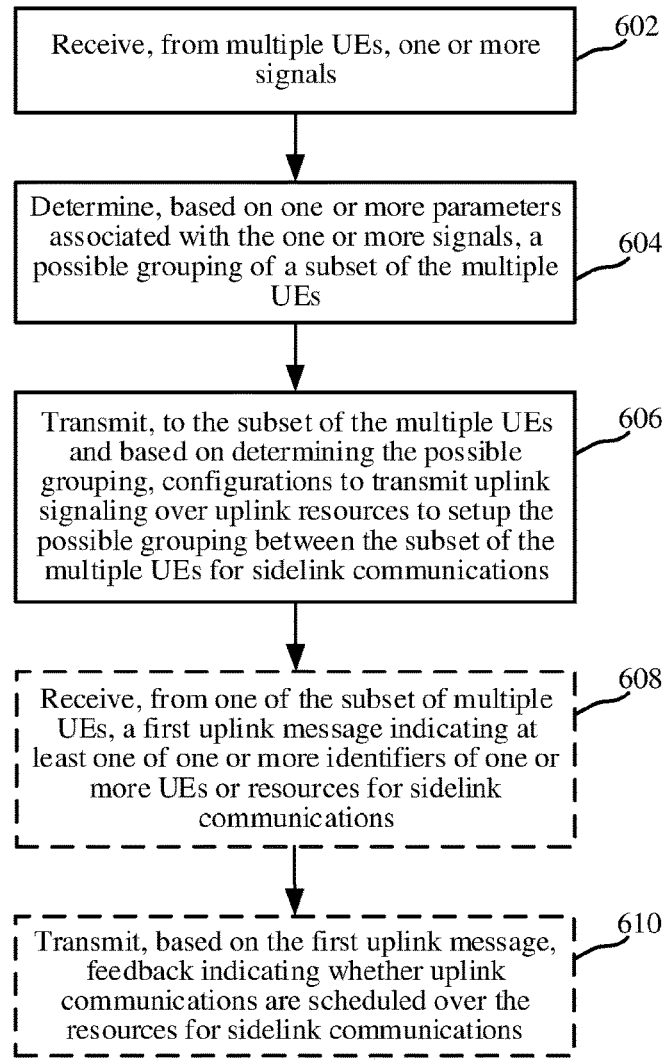
FIG. 6 is a flow chart illustrating an example of a method for configuring UEs to setup a group for sidelink communications, in accordance with various aspects of the present disclosure.

FIG. 6 illustrates a flow chart of an example of a method 600 for configuring UEs to establish a group for sidelink communications. In an example, a base station 102 can perform the functions described in method 600 using one or more of the components described in FIGS. 1 and 3.

In method 600, at Block 602, one or more signals can be received from multiple UEs. In an aspect, scheduling component 342, e.g., in conjunction with processor(s) 312, memory 316, transceiver 302, etc., can receive, from multiple UEs, one or more signals. For example, scheduling component 342 can receive the one or more signals over resources scheduled by scheduling component 342 for each of the multiple UEs. In this regard, the one or more signals can include uplink communications transmitted by the multiple UEs over corresponding control channels (e.g., physical uplink control channel (PUCCH)), shared channels (e.g., physical uplink shared channel (PUSCH)), etc.

In method 600, at Block 604, a possible grouping of a subset of the multiple UEs can be determined based on one or more parameters associated with the one or more signals. In an aspect, grouping component 352, e.g., in conjunction with processor(s) 312, memory 316, transceiver 302, scheduling component 342, etc., can determine, based on one or more parameters associated with the one or more signals, the possible grouping of the subset of the multiple UEs. For example, grouping component 352 can determine a subset of the multiple UEs that have a similar pathloss, which may imply a distance between the UEs and base station 102, and thus UEs having a similar distance may be near one another. For example, grouping component 352 can determine the pathloss based on measuring the signals from the UEs, based on an indication in control signaling from the UEs (e.g., an indication of downlink pathloss at the UEs), etc. In another example, grouping component 352 can determine the subset of the multiple UEs based on a beam utilized for communicating with the UEs. For example, the UEs can select and/or indicate a beam to the base station 102 to use in communications with the UE. Thus, grouping component 352 can determine the subset of UEs to be those using the same or a similar beam (e.g., a neighboring beam in a beam-sweep procedure). This may indicate the UEs as being in a similar region of base station 102 coverage. In one example, the pathloss and the beam may be used to determine relative proximity of the UEs and accordingly formulate the subset.

In an example, grouping component 352 can determine to group the UEs for sidelink communications based on one or more triggers, and can accordingly determine the possible grouping based on detecting the trigger(s). For example, a trigger for determining to group the UEs may include detecting parameters related to the UEs, such as determining that a difference in pathloss and/or timing advance for the UEs falls below a threshold. In another example, a trigger for determining to group the UEs may include determining that the UEs are requesting a certain service or an amount of data, quality-of-service (QoS), etc. that achieves a threshold. In another example, a trigger for determining to group the UEs may include determining that signal strength/quality for at least one of the UEs, as received at the base station 102, falls below a threshold, etc. In another example, the trigger for determining to group the UEs may include detecting parameters related to the base station 102, such as determining a load on the base station 102 achieves a threshold (and thus offloading the UEs to sidelink communications may free resources). In yet another example, the trigger for determining to group the UEs may be periodic (e.g., based on one or more timers).

In method 600, at Block 606, configurations to transmit uplink signaling over uplink resources to setup the possible grouping between the subset of the multiple UEs for sidelink communications can be transmitted to the subset of the multiple UEs and based on determining the possible grouping. In an aspect, grouping component 352, e.g., in conjunction with processor(s) 312, memory 316, transceiver 302, scheduling component 342, etc., can transmit, to the subset of the multiple UEs and based on determining the possible grouping, configurations to transmit uplink signaling over uplink resources to setup the possible grouping between the subset of the multiple UEs for sidelink communications. For example, this can include the configuration(s) received by UEs as described in Blocks 402 and 504 in FIGS. 4 and 5.

In one example, the configurations transmitted to each UE in the subset of UEs may include similar parameters for transmitting uplink signals to the base station 102. For example, for connected-mode UEs, the configurations may indicate the same RACH preamble to use by the subset of UEs in transmitting to the base station 102 as part of a RACH procedure. For idle-mode UEs, for example, the configuration may indicate the same set of RACH preambles for the subset of UEs from which to select in transmitting to the base station 102. In this regard, the subset of UEs, where within a proximity to one another, can detect the RACH preamble(s) from one another and can accordingly formulate a group for sidelink communications, as described above.

For example, grouping component 352 can transmit the configurations using RRC signaling, DCI signaling, etc., as described. In addition, as described, the grouping component 352 can select UEs to be grouped based on measurement (e.g., similar pathloss and/or within the same or neighboring beam). For RRC connected UEs, the base station 102 can configure UEs with similar timing advance to use the same specific preamble. For RRC idle UEs, the preamble can be randomly selected from a defined pool.

In method 600, optionally at Block 608, a first uplink message indicating at least one of one or more identifiers of one or more UEs or resources for sidelink communications can be received from one of the subset of multiple UEs. In an aspect, grouping component 352, e.g., in conjunction with processor(s) 312, memory 316, transceiver 302, scheduling component 342, etc., can receive, from one of the subset of multiple UEs, the first uplink message indicating at least one of one or more identifiers of one or more UEs or resources for sidelink communications. For example, grouping component 352 can receive the first uplink message as a conflict avoidance message, as described further herein, and may receive the conflict avoidance message as or with a RACH preamble in some examples (based on the configuration provided to the UE). In an example, the conflict avoidance message may indicate an identifier of one or more UEs to which the one of the subset of multiple UEs desires to transmit sidelink communications. Based on the identifier, conflict indicating component 354 may determine whether it has scheduled the one or more UEs for communications and whether associated resources conflict with the indicated sidelink resources.

In method 600, optionally at Block 610, feedback indicating whether uplink communications are scheduled over the resources for sidelink communications can be transmitted based on the first uplink message. In an aspect, conflict indicating component 354, e.g., in conjunction with processor(s) 312, memory 316, transceiver 302, scheduling component 342, etc., can transmit, based on the first uplink message, feedback indicating whether uplink communications are scheduled over the resources for sidelink communications. In one example, the feedback can be transmitted as or with a RACH response (e.g., where the first uplink message received at Block 608 is a RACH request) or other resources before the scheduled uplink communications.

Figure 7:
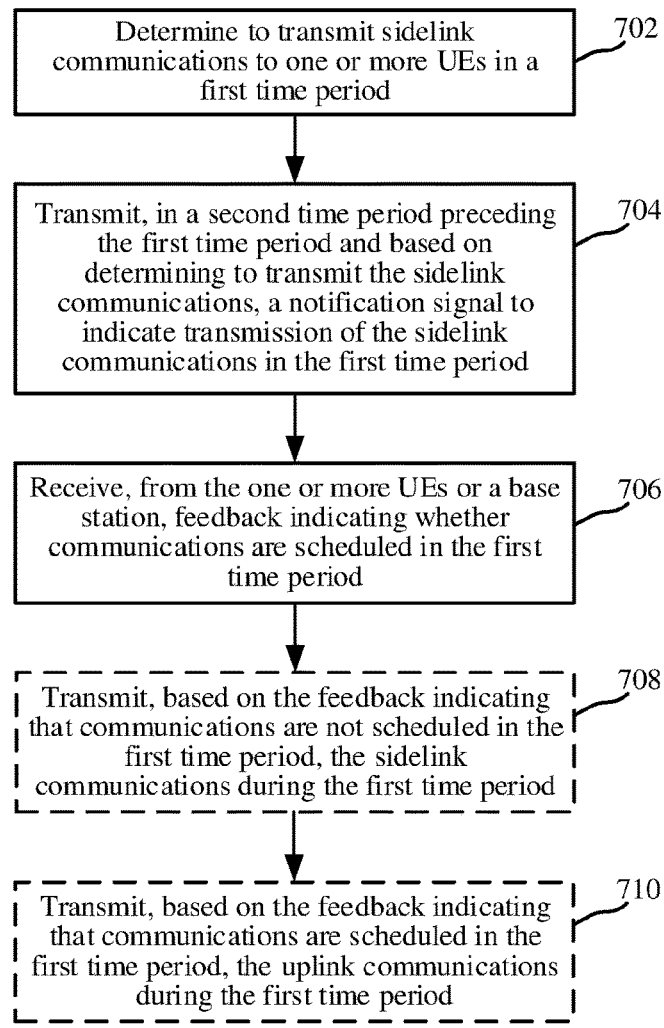
FIG. 7 is a flow chart illustrating an example of a method for transmitting conflict avoidance signals, in accordance with various aspects of the present disclosure.
Figure 8:
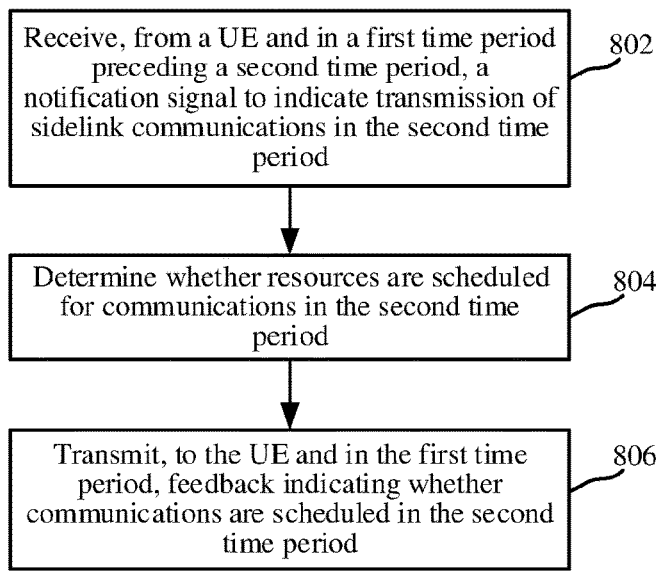
FIG. 8 is a flow chart illustrating an example of a method for receiving conflict avoidance signals, in accordance with various aspects of the present disclosure.

FIG. 7 illustrates a flow chart of an example of a method 700 for transmitting conflict avoidance signaling to avoid conflict between sidelink resources and configured uplink/downlink resources. FIG. 8 illustrates a flow chart of an example of a method 800 for responding to conflict avoidance signaling. Methods 700 and 800 are described in conjunction with one another for ease of explanation, though the methods 700 and 800 are not required to be performed in conjunction. In an example, a UE 104 can perform the functions described in method 700 using one or more of the components described in FIGS. 1 and 2 and/or another UE 104 or a base station 102 can perform the functions described in method 800 using one or more of the components described in FIGS. 1-3 (and in one example, a given UE 104 can be configured to perform both methods 700 and 800).

In method 700, at Block 702, it can be determined to transmit sidelink communications to one or more UEs in a first time period. In an aspect, communicating component 242, e.g., in conjunction with processor(s) 212, memory 216, transceiver 202, etc., can determine to transmit sidelink communications to one or more UEs in a first time period. In one example, communicating component 242 can determine to transmit the sidelink communications based at least in part on the group setup component 252 determining to setup the group of UEs (e.g., including the one or more UEs and UE 104) for sidelink communications (e.g., as in one or more of the examples described above in reference to FIGS. 4-6), receiving an indication of setup from the one or more UEs, etc. In an example, the first time period can correspond to a symbol (e.g., orthogonal frequency division multiplexing (OFDM) symbol), a slot comprising multiple symbols, a subframe comprising multiple slots, and/or the like, and a time transmission interval (TTI) for the UE 104 and/or the one or more other UEs can be a symbol, multiple symbols, a slot, multiple slots, a subframe, and/or the like. Based on determining to transmit the sidelink communications, the transmitting UE 104 can determine to transmit a conflict avoidance signal, as described herein.

In method 700, at Block 704, a notification signal can be transmitted, in a second time period preceding the first time period and based on determining to transmit the sidelink communications, to indicate transmission of the sidelink communications in the first time period. In an aspect, conflict avoiding component 256, e.g., in conjunction with processor(s) 212, memory 216, transceiver 202, communicating component 242, etc., can determine to transmit and/or transmit, in the second time period preceding the first time period (e.g., in a preceding symbol, slot, subframe, one or more thereof, etc.) and based on determining to transmit the sidelink communications, the notification signal (e.g., a conflict avoidance signal) to indicate transmission of the sidelink communications in the first time period. In one example, the notification signal may include an identifier of one or more UEs to receive the sidelink communications, an indication of sidelink resources and/or the like to facilitate a determination of whether the sidelink resources conflict with uplink/downlink resources scheduled by the base station 102 to the one or more other UEs (e.g., and/or to UE 104). As described, conflict avoiding component 256 can transmit the notification signal to a base station 102 and/or to the one or more UEs that are to receive sidelink communications from the UE 104. In addition, in one example, conflict avoiding component 256 can transmit the notification signal as the first uplink message, RACH preamble, etc., described in Block 406 in FIG. 4.

In method 800, at Block 802, a notification signal to indicate transmission of sidelink communications in a second time period can be received from a UE in a first time period preceding the second time period. In an aspect, conflict avoiding component 256 of a UE 104, e.g., in conjunction with processor(s) 212, memory 216, transceiver 202, communicating component 242, etc., can receive, from the UE and in the first time period preceding the second time period, the notification signal to indicate transmission of sidelink communications in the second time period. The first time period and the second time period can correspond to symbols, slots, subframes, etc., as described. In an example, conflict avoiding component 256 can determine whether the base station 102 has scheduled resources that would conflict with the sidelink resources based on the indication of sidelink resources in the notification signal.

In another aspect, conflict indicating component 354 of a base station 102, e.g., in conjunction with processor(s) 312, memory 316, transceiver 302, scheduling component 342, etc., can receive, from the UE and in the first time period preceding the second time period, the notification signal to indicate transmission of sidelink communications in the second time period. In an example, conflict indicating component 354 can determine whether scheduling component 342 has scheduled resources that would conflict (or overlap, e.g., in time and/or in frequency) with the sidelink resources based on the indication of sidelink resources in the notification signal.

In method 800, at Block 804, it can be determined whether resources are scheduled for communication in the second time period. In an aspect, conflict avoiding component 256 of a UE 104, e.g., in conjunction with processor(s) 212, memory 216, transceiver 202, communicating component 242, etc., can determine whether resources are scheduled for communications in the second time period. In an example, conflict avoiding component 256 can determine whether the base station 102 has scheduled resources (e.g., downlink resources) for the UE 104 receiving the notification and to receive the sidelink communications that would conflict with the sidelink resources. For example, conflict avoiding component 256 can compare resource scheduling from the base station 102 with the indication of sidelink resources in the notification signal to determine any overlap (e.g., in time and/or in frequency).

In another aspect, conflict indicating component 354 of a base station 102, e.g., in conjunction with processor(s) 312, memory 316, transceiver 302, scheduling component 342, etc., can determine whether resources are scheduled for communications in the second time period. In an example, conflict indicating component 354 can determine whether scheduling component 342 has scheduled resources (e.g., uplink resources) for the UE 104 transmitting the notification signal and desiring to transmit the sidelink communications that would conflict with the sidelink resources based on the indication of sidelink resources in the notification signal.

In method 800, at Block 806, feedback indicating whether communications are scheduled in the second time period can be transmitted to the UE and in the first time period. In an aspect, conflict avoiding component 256 of a UE 104, e.g., in conjunction with processor(s) 212, memory 216, transceiver 202, communicating component 242, etc., can transmit, to the UE and in the first time period, feedback indicating whether communications are scheduled in the second time period. In an example, conflict avoiding component 256 can transmit the feedback, to the UE that transmits the notification signal and desires to transmit sidelink communications, based on the determination in Block 804.

In another aspect, conflict indicating component 354 of a base station 102, e.g., in conjunction with processor(s) 312, memory 316, transceiver 302, scheduling component 342, etc., can transmit, to the UE and in the first time period, feedback indicating whether communications are scheduled in the second time period. In an example, conflict indicating component 354 can transmit the feedback, to the UE that transmits the notification signal and desires to transmit sidelink communications, based on the determination in Block 804. In addition, in one example, conflict avoiding component 256 and/or conflict indicating component 354 can transmit the feedback signal as the second uplink message, RACH response, etc., described in Block 508 in FIG. 5.

In method 700, at Block 706, feedback indicating whether communications are scheduled in the second time period can be received from the one or more UEs or a base station. In an aspect, conflict avoiding component 256, e.g., in conjunction with processor(s) 212, memory 216, transceiver 202, communicating component 242, etc., can receive, from the one or more UEs or the base station, feedback indicating whether communications are scheduled in the first time period. For example, the feedback may be hybrid automatic repeat/request (HARQ) feedback indicating acknowledgement (ACK) or non-acknowledgement (NACK). In one example, the HARQ feedback can be used for indicating that resources for uplink/downlink communications are not scheduled during the sidelink resources (e.g., using ACK)) or that resources for uplink/downlink communications are scheduled during, or overlap, the sidelink resources (e.g., using NACK). In this example, conflict avoiding component 256 can determine whether to transmit sidelink communications based at least in part on the feedback.

In an example, in method 700, optionally at Block 708, the sidelink communications can be transmitted during the first time period based on the feedback indicating that communications are not scheduled in the first time period. In an aspect, conflict avoiding component 256, e.g., in conjunction with processor(s) 212, memory 216, transceiver 202, communicating component 242, etc., can transmit, based on the feedback indicating that communications are not scheduled in the first time period, the sidelink communications during the first time period. In another example, in method 700, optionally at Block 710, the uplink communications can be transmitted during the first time period based on the feedback indicating that communications are scheduled in the first time period. In an aspect, conflict avoiding component 256, e.g., in conjunction with processor(s) 212, memory 216, transceiver 202, communicating component 242, etc., can transmit, based on the feedback indicating that communications are scheduled in the first time period, the uplink communications during the first time period.

In another example, conflict avoiding component 256 can determine whether to transmit sidelink communications where uplink transmissions are scheduled for the UE 104 based on one or more priority rules. In one example, some types of sidelink communications can be prioritized for transmission over some types of uplink communications and/or vice versa). In one specific example, control channel communications and sounding reference signal (SRS), physical RACH (PRACH), etc. can be prioritized over sidelink communications (and/or sidelink communications can otherwise be prioritized over other types of uplink communications).

Figure 9:
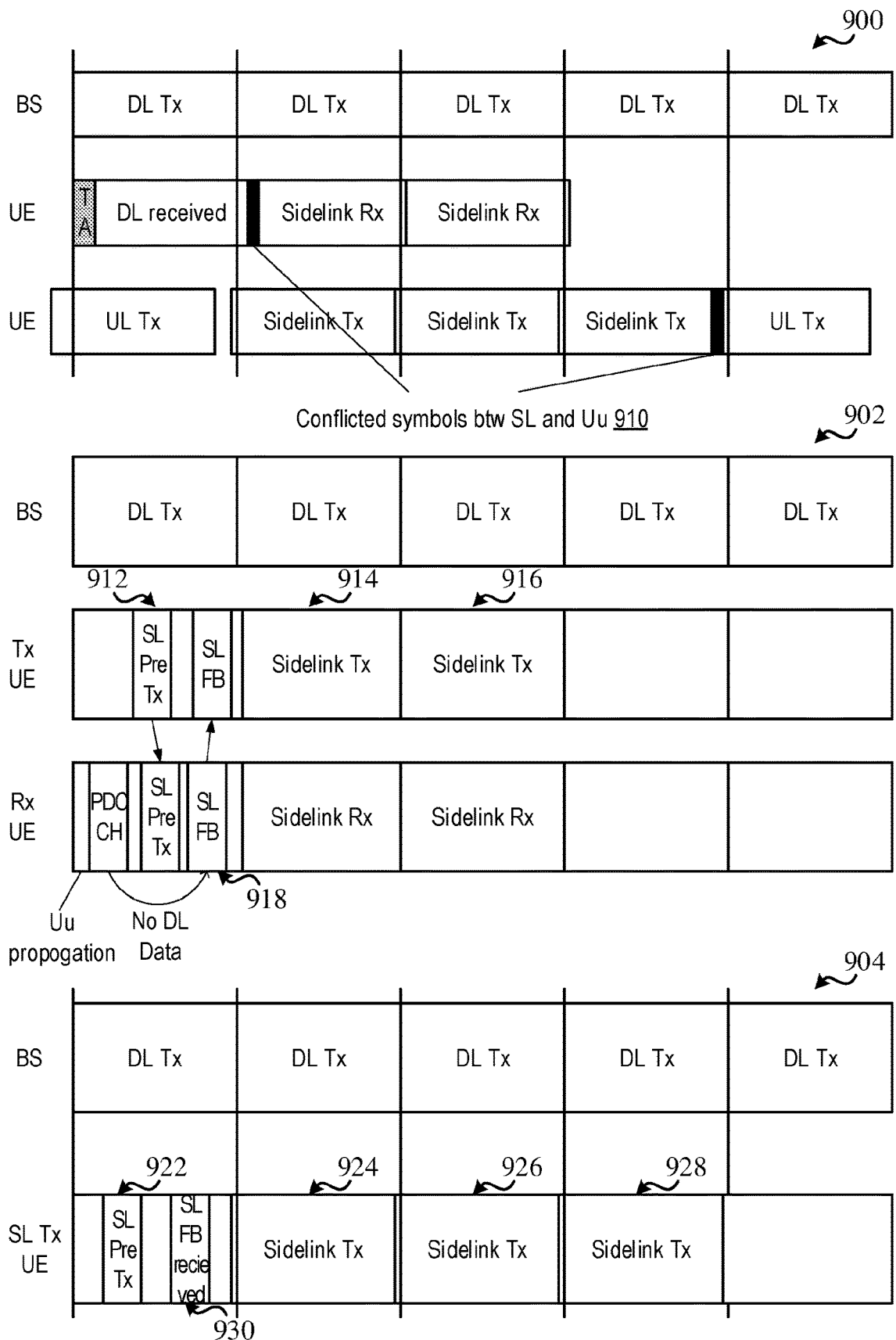
FIG. 9 illustrates an example of resource allocations for transmitting conflict avoidance signals, in accordance with various aspects of the present disclosure.

FIG. 9 illustrates specific examples of the notification signaling. In FIG. 9 a resource allocation 900 includes various downlink transmissions (DL Tx) scheduled for a base station in various consecutive time periods (e.g., slots). In addition, a UE receiving downlink communications and sidelink communications can experience conflict in possibly concurrently receiving both downlink and sidelink communications in the resources scheduled for receiving the downlink communications and/or sidelink communications. For example, the conflict may be based at least in part on a timing advance configured for receiving the downlink communications (which may not be needed for sidelink communications and may cause the downlink communications to be received at least partially within the next time period that may be scheduled for receiving sidelink communications). In addition, a UE transmitting uplink communications and transmitting sidelink communications can experience conflict in possibly concurrently transmitting both the uplink and sidelink communications in the resources for transmitting uplink communications and sidelink communications based at least in part on a timing advance configured for transmitting the uplink communications (which may not be needed for sidelink communications and may cause the sidelink communications to be transmitted at least partially within the next time period that may be scheduled for transmitting uplink communications). Both cases are illustrated at symbols 910.

For example, there may be a downlink reception conflict where sidelink resources use the downlink spectrum/slots, which may lead to potential conflict between Rx signals from sidelink and downlink. In addition, there may be an uplink transmission conflict where sidelink resources use the uplink spectrum/slots, which can be similar to LTE sidelink. This may lead potential conflict between uplink Tx and sidelink Tx. In this example, the UE can drop the uplink communications (e.g., over the Uu interface) or sidelink Tx in symbols 910, but this may lead to some performance (latency, throughput) loss.

Resource allocations 902 and 904 show notification signaling to prevent the conflict(s) shown in resource allocation 900, in accordance with aspects described herein. For example, in resource allocation 902, the transmitting UE can transmit a SL Pre-tx 912 (e.g., the notification signal or conflict avoidance signal, as described herein) to a receiving UE to notify the receiving UE about the following sidelink transmission 914, 916. The Pre-tx signal 912 can indicate resources that are used for sidelink communications. A receiving UE can receive the SL Pre-tx 912 (e.g., after PDCCH), and can transmit feedback (SL FB 918) indicating whether downlink resources are scheduled at least partially within resources for sidelink communications. If so, the receiving UE can transmit the SL FB 918 as a NACK, and the transmitting UE can avoid transmitting sidelink communications based on receiving the NACK, which can include falling back if the message is unicast or groupcast message. In another example in resource allocation 902, however, the receiving UE can transmit the SL FB 918 as an ACK indicating that downlink resources are not scheduled within the sidelink resource, and the transmitting UE can accordingly transmit sidelink transmission 914, 916 in the subsequent resources based on receiving the ACK. In an example, the feedback signal can occur right after the DCI/control resource set (CORESET) (e.g., in subsequent symbols of the same slot).

In addition, as described, the SL Pre-tx signal 912 can leverage the MSG-A preamble and PUSCH, and the SL feedback 918 can leverage the MSG-B design described above. In this example, the SL Pre-tx signal 912 transmitted as RACH preamble can include a target UE identifier and occupied resources (e.g., symbols/slots with reference time point). In addition, in this example, the SL FB 918 transmitted as RACH response can deliver positive or negative confirmation, as described.

For example, in resource allocation 904, the transmitting UE can transmit a SL Pre-tx 922 (e.g., the notification signal or conflict avoidance signal, as described herein) to the base station to report resource occupation (e.g., to indicate resources for sidelink communications). In one example, the transmitting UE may expect the base station to not schedule uplink resources that overlap with the indicated sidelink resources, such as sidelink transmissions 924, 926, 928. The base station can receive the SL Pre-tx 922 (e.g., after PDCCH), and can transmit SL feedback 930 indicating whether uplink resources for the transmitting UE are (or will be) scheduled at least partially within resources for sidelink transmissions, 924, 926, 928. If so, the transmitting UE can avoid transmitting in the resources indicated for sidelink transmissions 924, 926, 928. For example, the base station can feedback ACK to confirm no uplink to be scheduled or NACK to hold the sidelink transmission, or the base station can conform uplink scheduling if any urgent uplink transmission. In this depicted example of resource allocation 904, however, the base station can transmit an ACK indicating that uplink resources are not scheduled (and will not be scheduled) within the sidelink resource and the transmitting UE can accordingly transmit sidelink communications in the subsequent resources for sidelink transmissions 924, 926, 928.

In addition, as described, the SL Pre-tx 922 signal can leverage the MSG-A preamble and PUSCH, and the SL feedback 930 can leverage the MSG-B design described above. In this example, the SL Pre-tx signal 922 transmitted as RACH preamble can include a target UE identifier and occupied resources (e.g., symbols/slots with reference time point). In addition, in this example, the SL FB 930 transmitted as RACH response can deliver positive or negative confirmation, as described.

Figure 10:
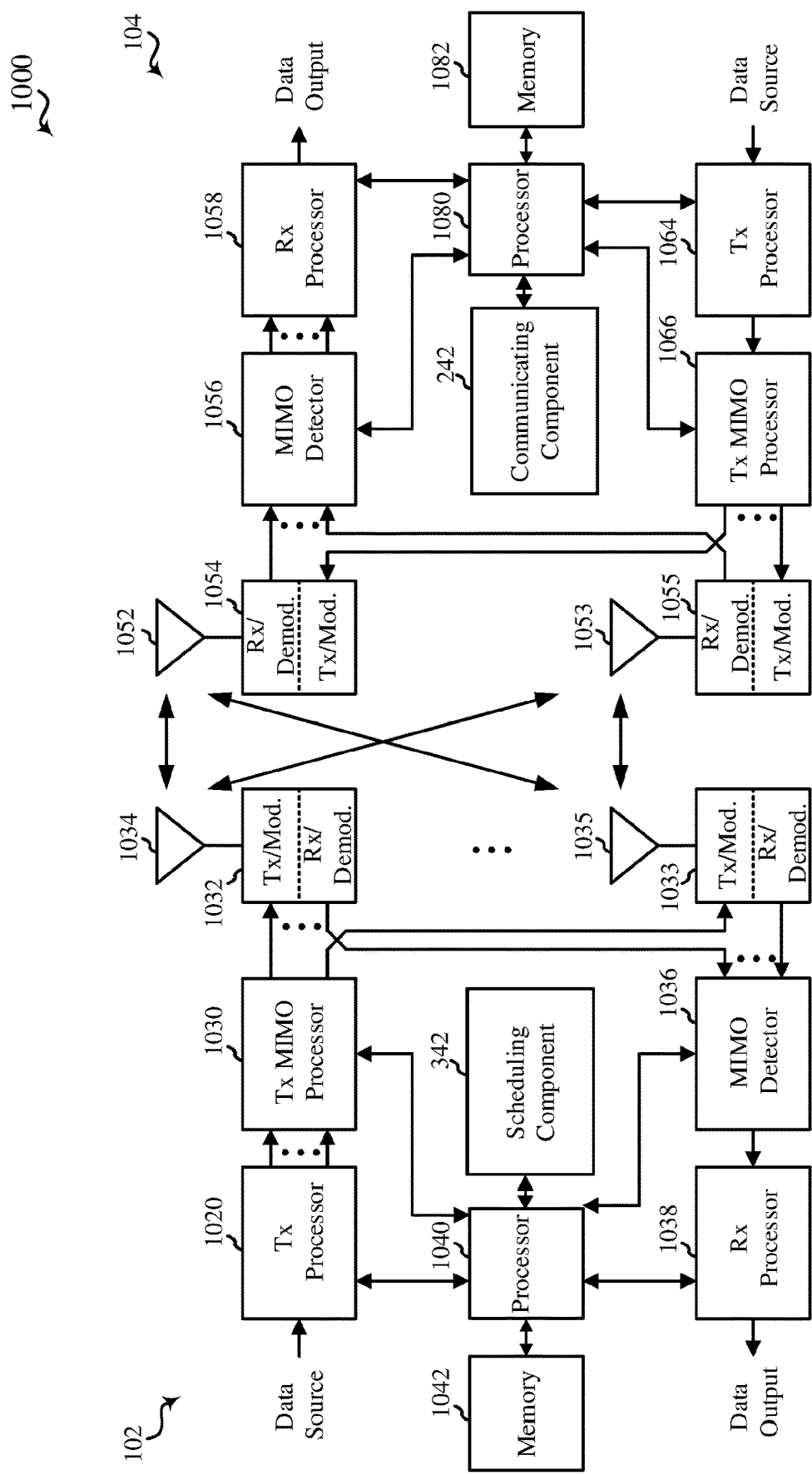
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104, in accordance with various aspects of the present disclosure. The MIMO communication system 1000 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
receiving, from a base station, a configuration to transmit uplink signaling to the base station;
determining, based on the configuration, to setup a group for sidelink communication with one or more other user equipments (UEs);
transmitting, based on determining to setup the group, a first uplink message based on the configuration from the base station; and
receiving, from the one or more other UEs, a second uplink message based on the configuration to indicate setup of the group.

2. The method of example 1, wherein the uplink signaling includes random access signaling, and wherein the first uplink message is a first message in a random access procedure.

3. The method of any of examples 1 or 2, wherein the first uplink message includes one or more parameters related to the group.

4. The method of example 3, wherein the one or more parameters include a timing adjustment or advance, a resource pool for sidelink communications, a sidelink radio network temporary identifier, a transmission power, or a modulation and coding scheme.

5. The method of any of examples 1 to 4, further comprising transmitting, based on receiving the second uplink message, sidelink communications to the one or more other UEs.

6. The method of any of examples 1 to 5, wherein receiving the configuration comprises receiving the configuration in radio resource control (RRC) or downlink control information (DCI) signaling from the base station.

7. The method of any of examples 1 to 6, wherein the first uplink message indicates at least one of an identifier of the one or more other UEs or resources used for sidelink communications.

8. The method of example 7, wherein the second uplink message indicates an acknowledgement of receiving the first uplink message, and further comprising transmitting sidelink communications to the one or more other UEs based at least in part on the acknowledgement.

9. A method for wireless communication, comprising:
receiving, from a base station, a configuration to transmit uplink signaling to the base station;
receiving, from a user equipment (UE), a first uplink message based on the configuration from the base station;
determining, based on the first uplink message received from the UE, to setup a group for sidelink communication with the UE; and
transmitting, based on determining to setup the group, a second uplink message over uplink resources determined based on the configuration to indicate setup of the group.

10. The method of example 9, wherein the uplink signaling includes random access signaling, and wherein the first uplink message is a first message in a random access procedure.

11. The method of any of examples 9 or 10, wherein the first uplink message includes one or more parameters related to the group.

12. The method of example 11, wherein the one or more parameters include a timing adjustment or advance, a resource pool for sidelink communications, a sidelink radio network temporary identifier, a transmission power, or a modulation and coding scheme.

13. The method of any of examples 9 to 12, further comprising generating the second uplink message to indicate at least one of a random access preamble from the first uplink message or a corresponding random access channel resource.

14. The method of any of examples 9 to 13, wherein receiving the configuration comprises receiving the configuration in radio resource control (RRC) or downlink control information (DCI) signaling from the base station.

15. The method of any of examples 9 to 14, wherein the first uplink message indicates at least one of an identifier or resources used for sidelink communications.

16. The method of any of examples 9 to 15, wherein transmitting the second uplink message is based at least in part on at least one of the identifier and determining that downlink communications are not scheduled from the base station over the resources used for sidelink communications.

17. A method for wireless communication, comprising:
receiving, from multiple user equipments (UEs), one or more signals;
determining, based on one or more parameters associated with the one or more signals, a possible grouping of a subset of the multiple UEs; and
transmitting, to the subset of the multiple UEs and based on determining the possible grouping, configurations to transmit uplink signaling over uplink resources to setup the possible grouping between the subset of the multiple UEs for sidelink communications.

18. The method of example 17, wherein the configurations relate to a random access configuration for transmitting uplink signaling as one or more random access messages.

19. The method of any of examples 17 or 18, wherein transmitting the configurations comprises transmitting the configurations in radio resource control (RRC) or downlink control information (DCI) signaling to the subset of the multiple UEs.

20. The method of any of examples 17 to 19, wherein determining the possible grouping is based at least in part on determining a similar value for the one or more parameters of the one or more signals received from the subset of the multiple UEs.

21. The method of example 20, wherein the one or more parameters correspond to at least one of a pathloss or a beamforming associated with the one or more signals.

22. The method of any of examples 17 to 21, wherein the configurations include random access preambles, and further comprising generating at least two of the configurations to indicate the same random access preamble for different ones of the subset of the multiple UEs determined to have a similar timing advance.

23. The method of any of examples 17 to 22, wherein the configurations include a same pool of random access preambles from which the subset of the multiple UEs can select for transmitting the uplink signaling.

24. The method of any of examples 17 to 23, further comprising:
receiving, from one of the subset of the multiple UEs, a first uplink message indicating at least one of one or more identifiers of one or more UEs or resources for sidelink communications; and
transmitting, based on the first uplink message, feedback indicating whether uplink communications are scheduled over the resources for sidelink communications.

25. A method for wireless communication, comprising:
determining to transmit sidelink communications to one or more user equipments (UEs) in a first time period;
transmitting, in a second time period preceding the first time period and based on determining to transmit the sidelink communications, a notification signal to indicate transmission of the sidelink communications in the first time period; and
receiving, from the one or more UEs or a base station, feedback indicating whether communications are scheduled in the first time period.

26. The method of example 25, further comprising transmitting, based on the feedback indicating that communications are not scheduled in the first time period, the sidelink communications during the first time period.

27. The method of any of examples 25 or 26, further comprising transmitting, based on the feedback from the base station indicating that communications are scheduled in the first time period, uplink communications during the first time period.

28. The method of any of examples 25 to 27, wherein receiving the feedback comprises receiving the feedback from the one or more UEs, indicating whether downlink communications are scheduled to the one or more UEs in the first time period, after a downlink control information (DCI) or control resource set (CORESET) transmission.

29. The method of any of examples 25 to 28, wherein receiving the feedback comprises receiving the feedback from the base station, indicating whether uplink communications are scheduled to the one or more UEs or other UEs in the first time period.

30. The method of any of examples 25 to 29, wherein the notification signal indicates at least one of one or more identifiers of the one or more UEs or resources used for sidelink communications.

31. A method for wireless communication, comprising:
receiving, from a user equipment (UE) and in a first time period preceding a second time period, a notification signal to indicate transmission of sidelink communications in the second time period;
determining whether resources are scheduled for communications in the second time period; and
transmitting, to the UE and in the first time period, feedback indicating whether communications are scheduled in the second time period.

32. The method of example 31, wherein determining whether the resources are scheduled comprises determining whether a base station has scheduled resources for receiving downlink communications in the second time period.

33. The method of example 32, wherein transmitting the feedback comprises transmitting the feedback after a downlink control information (DCI) or control resource set (CORESET) transmission by the base station.

34. The method of any of examples 31 to 33, wherein determining whether the resources are scheduled comprises determining whether uplink communications are scheduled for the UE or one or more other UEs in the second time period.

35. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in any of examples 1-34.

36. An apparatus for wireless communication, comprising means for performing the operations of one or more methods in any of examples 1-34.

37. A computer-readable medium, comprising code executable by one or more processors to perform the operations of one or more methods in any of examples 1-34.

What is claimed is:

1. A method for wireless communication, comprising:
receiving, by a user equipment (UE) and from a base station, a configuration to transmit uplink signaling to the base station;
determining, by the UE and based on the configuration, to setup a group for sidelink communication with one or more other UEs;
transmitting, by the UE, to the one or more other UEs in the group, and based on determining to setup the group, a first uplink message based on the configuration from the base station; and
receiving, by the UE and from the one or more other UEs, a second uplink message based on the configuration to indicate setup of the group.

2. The method of claim 1, wherein the uplink signaling includes random access signaling, and wherein the first uplink message is a first message in a random access procedure.

3. The method of claim 1, wherein the first uplink message includes one or more parameters related to the group.

4. A method for wireless communication, comprising:
receiving, by a user equipment (UE) and from a base station, a configuration to transmit uplink signaling to the base station;
receiving, by the UE and from another UE, a first uplink message based on the configuration from the base station;
determining, by the UE and based on the first uplink message received from the other UE, to setup a group for sidelink communication with the other UE; and
transmitting, by the UE and based on determining to setup the group, a second uplink message over uplink resources determined based on the configuration to indicate setup of the group.

5. The method of claim 4, wherein the uplink signaling includes random access signaling, and wherein the first uplink message is a first message in a random access procedure.

6. An apparatus for wireless communication, comprising:
a transceiver;
a memory configured to store instructions; and
one or more processors communicatively coupled with the transceiver and the memory, wherein the one or more processors are configured to:
receive, from a base station, a configuration to transmit uplink signaling to the base station;
determine, based on the configuration, to setup a group for sidelink communication with one or more other user equipments (UEs);
transmit, to the one or more other UEs in the group and based on determining to setup the group, a first uplink message based on the configuration from the base station; and
receive, from the one or more other UEs, a second uplink message based on the configuration to indicate setup of the group.

7. The apparatus of claim 6, wherein the uplink signaling includes random access signaling, and wherein the first uplink message is a first message in a random access procedure.

8. The apparatus of claim 6, wherein the first uplink message includes one or more parameters related to the group.

9. The apparatus of claim 8, wherein the one or more parameters include a timing adjustment or advance, a resource pool for sidelink communications, a sidelink radio network temporary identifier, a transmission power, or a modulation and coding scheme.

10. The apparatus of claim 6, wherein the one or more processors are further configured to transmit, based on receiving the second uplink message, sidelink communications to the one or more other UEs.

11. The apparatus of claim 6, wherein the one or more processors are further configured to:
determine, based on receiving the second uplink message, to transmit sidelink communications to the one or more other UEs in a first time period;
transmit, in a second time period preceding the first time period and based on determining to transmit the sidelink communications, a notification signal to indicate transmission of the sidelink communications in the first time period; and
receive, from the one or more other UEs or a base station, feedback indicating whether other communications are scheduled in the first time period.

12. The apparatus of claim 11, wherein the one or more processors are further configured to transmit, based on the feedback indicating that communications are not scheduled in the first time period, the sidelink communications during the first time period.

13. The apparatus of claim 11, wherein the one or more processors are further configured to transmit, based on the feedback from the base station indicating that communications are scheduled in the first time period, uplink communications during the first time period.

14. The apparatus of claim 11, wherein the one or more processors are configured to receive the feedback from the one or more other UEs, indicating whether downlink communications are scheduled to the one or more other UEs in the first time period, after a downlink control information (DCI) or control resource set (CORESET) transmission.

15. The apparatus of claim 11, wherein the one or more processors are configured to receive the feedback from the base station, indicating whether uplink communications are scheduled to the one or more other UEs in the first time period.

16. The apparatus of claim 11, wherein the notification signal indicates at least one of one or more identifiers of the other one or more UEs or resources used for sidelink communications.

17. The apparatus of claim 6, wherein the one or more processors are configured to receive the configuration in radio resource control (RRC) or downlink control information (DCI) signaling from the base station.

18. The apparatus of claim 6, wherein the first uplink message indicates at least one of an identifier of the one or more other UEs or resources used for sidelink communications.

19. The apparatus of claim 18, wherein the second uplink message indicates an acknowledgement of receiving the first uplink message, and wherein the one or more processors are further configured to transmit sidelink communications to the one or more other UEs based at least in part on the acknowledgement.

20. An apparatus for wireless communication, comprising:
a transceiver;

a memory configured to store instructions; and
one or more processors communicatively coupled with the transceiver and the memory, wherein the one or more processors are configured to:
 receive, from a base station, a configuration to transmit uplink signaling to the base station;
 receive, from a user equipment (UE), a first uplink message based on the configuration from the base station;
 determine, based on the first uplink message received from the UE, to setup a group for sidelink communication with the UE; and
 transmit, based on determining to setup the group, a second uplink message over uplink resources determined based on the configuration to indicate setup of the group.

21. The apparatus of claim 20, wherein the uplink signaling includes random access signaling, and wherein the first uplink message is a first message in a random access procedure.

22. The apparatus of claim 20, wherein the first uplink message includes one or more parameters related to the group.

23. The apparatus of claim 22, wherein the one or more parameters include a timing adjustment or advance, a resource pool for sidelink communications, a sidelink radio network temporary identifier, a transmission power, or a modulation and coding scheme.

24. The apparatus of claim 20, wherein the one or more processors are further configured to generate the second uplink message to indicate at least one of a random access preamble from the first uplink message or a corresponding random access channel resource.

25. The apparatus of claim 20, wherein the one or more processors are further configured to:
 receive, from the UE and in a first time period preceding a second time period, a notification signal to indicate transmission of sidelink communications in the second time period;
 determine whether resources are scheduled for communications in the second time period; and
 transmit, to the UE and in the first time period, feedback indicating whether communications are scheduled in the second time period.

26. The apparatus of claim 25, wherein the one or more processors are configured to determine whether the resources are scheduled at least in part by determining whether a base station has scheduled resources for receiving downlink communications in the second time period.

27. The apparatus of claim 26, wherein the one or more processors are configured to transmit the feedback after a downlink control information (DCI) or control resource set (CORESET) transmission by the base station.

28. The apparatus of claim 25, wherein the one or more processors are further configured to determine whether the resources are scheduled at least in part by determining whether uplink communications are scheduled for the UE or one or more other UEs in the second time period.

29. The apparatus of claim 28, wherein the one or more processors are configured to receive the configuration in radio resource control (RRC) or downlink control information (DCI) signaling from the base station.

30. The apparatus of claim 20, wherein the first uplink message indicates at least one of an identifier or resources used for sidelink communications.

31. The apparatus of claim 30, wherein the one or more processors are further configured to transmit the second uplink message based at least in part on at least one of the identifier and determining that downlink communications are not scheduled from the base station over the resources used for sidelink communications.

32. An apparatus for wireless communication, comprising:
 a transceiver;
 a memory configured to store instructions; and
 one or more processors communicatively coupled with the transceiver and the memory, wherein the one or more processors are configured to:
  receive, from a user equipment (UE) and in a first time period preceding a second time period, a notification signal to indicate transmission of sidelink communications in the second time period; and
  transmit, to the UE and in the first time period, feedback indicating, by an acknowledgement (ACK) or negative-ACK (NACK) value, whether communications are scheduled in the second time period.

33. The apparatus of claim 32, wherein the one or more processors are configured to transmit the feedback based on whether a base station has scheduled resources for receiving downlink communications in the second time period.

34. The apparatus of claim 33, wherein the one or more processors are configured to transmit the feedback after a downlink control information (DCI) or control resource set (CORESET) transmission by the base station.

35. The apparatus of claim 32, wherein the one or more processors are configured to transmit the feedback based on whether uplink communications are scheduled for the UE or one or more other UEs in the second time period.

36. The apparatus of claim 6, wherein the second uplink message is a message in a random access procedure.

* * * * *